6 Sheets--Sheet 1.

JOHN G. COOEY.
Lamp-Cooking Apparatus.

No. 126,874.  Patented May 21, 1872.

WITNESSES.
Villette Anderson,
G. E. Upham,

INVENTOR.
Jno. G. Cooey.
Chipman Hosmer & Co,
Attys.

JOHN G. COOEY.
Lamp-Cooking Apparatus.

No. 126,874.                         Patented May 21, 1872.

WITNESSES.
Villette Anderson.
G. E. Upham.

INVENTOR.
John G. Cooey
Chipman Hosmer & Co.
Attys

AM. PHOTO-LITHOGRAPHIC CO. N.Y. (OSBORNE'S PROCESS.)

JOHN G. COOEY.
Lamp-Cooking Apparatus.

No. 126,874.

6 Sheets--Sheet 3.

Patented May 21, 1872.

WITNESSES.
Villette Anderson
G. E. Upham.

INVENTOR.
John G. Cooey
Chipman Hosmer & Co.
Attys.

6 Sheets--Sheet 6.

JOHN G. COOEY.

Lamp-Cooking Apparatus.

No. 126,874.  Patented May 21, 1872.

WITNESSES.
Villette Anderson,
Geo. C. Upham,

INVENTOR.
Jno. G. Cooey,
Chipman Hosmer & Co,
Attys.

126,874

UNITED STATES PATENT OFFICE.

JOHN GRAHAM COOEY, OF ST. JOHN, CANADA.

IMPROVEMENT IN LAMP COOKING APPARATUS.

Specification forming part of Letters Patent No. 126,874, dated May 21, 1872.

*To all whom it may concern:*

Be it known that I, JOHN GRAHAM COOEY, of St. John, in the Province of New Brunswick, Canada, have invented a new and valuable Improvement in Cooking Apparatus; and I do hereby declare that the following is a full, clear, and exact description of the construction and operation of the same, reference being had to the annexed drawing making a part of this specification, and to the letters and figures of reference marked thereon.

Figure 1:
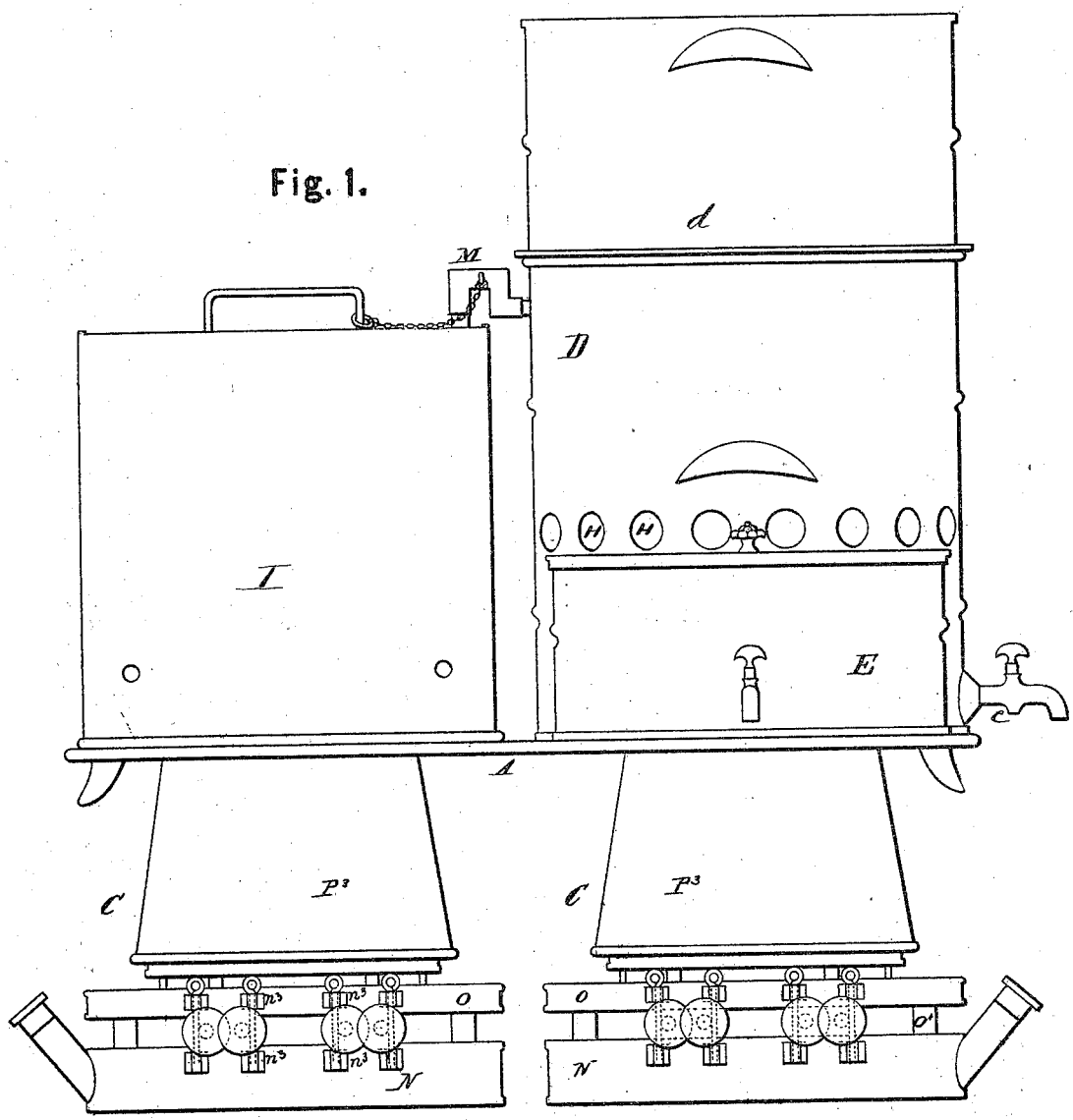
Figure 2:
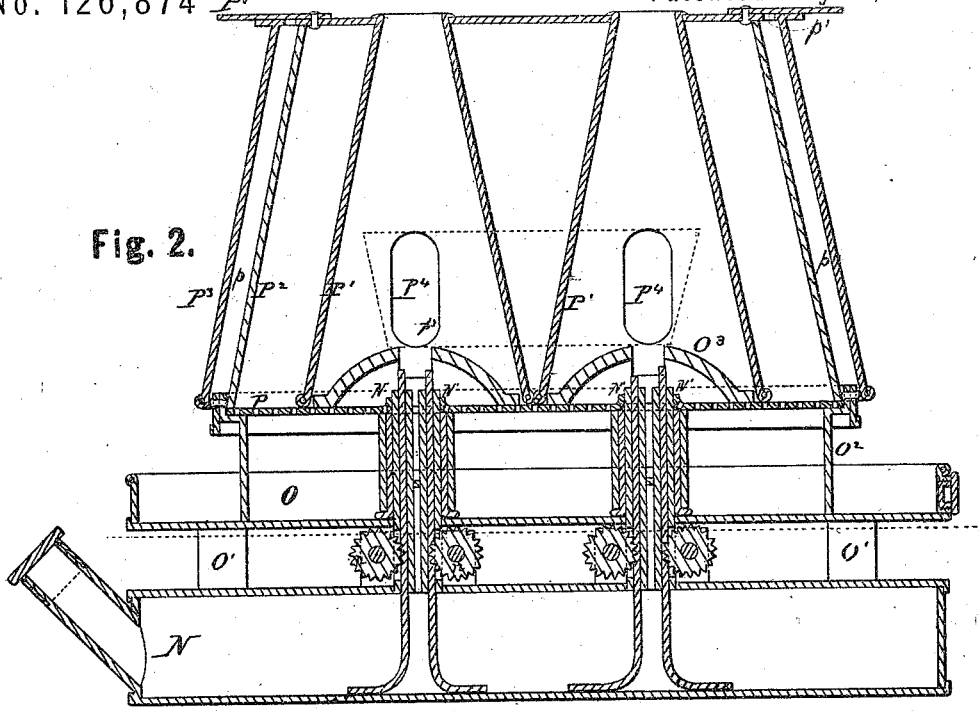
Figure 3:
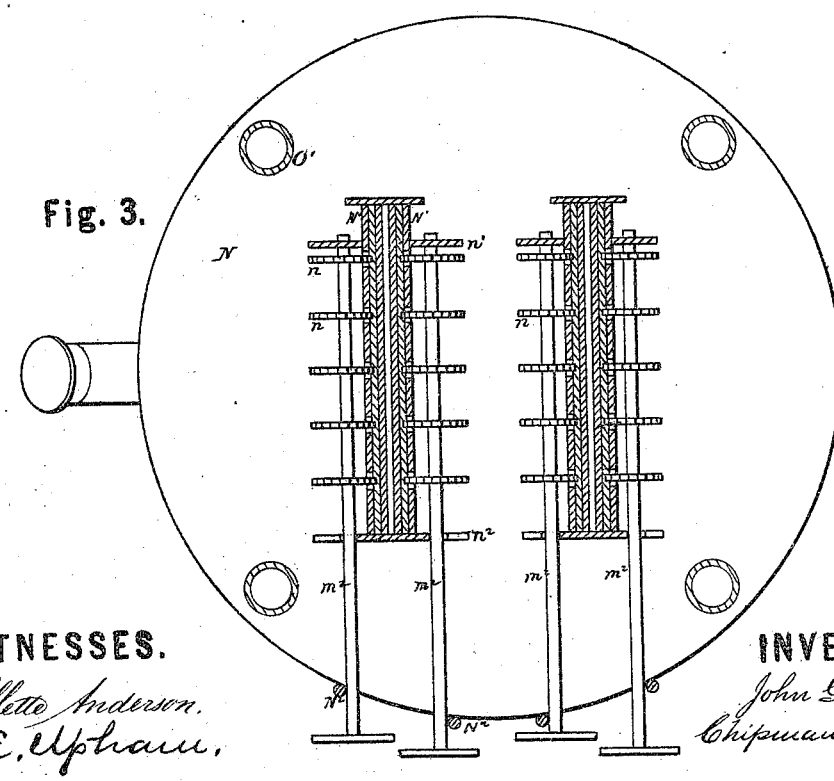
Figure 4:
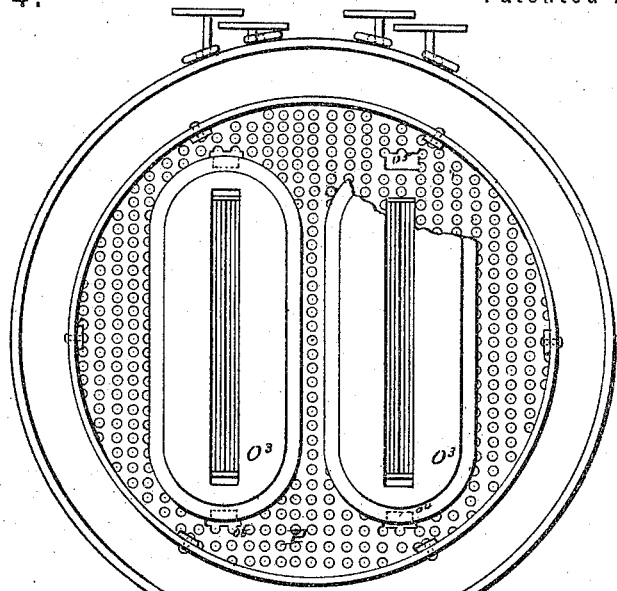
Figure 5:
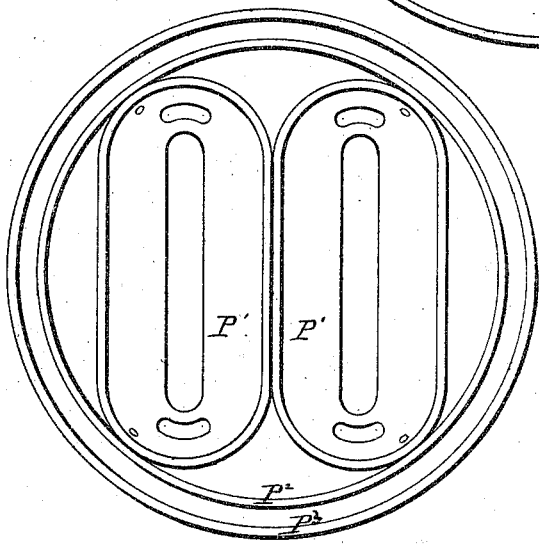
Figure 6:
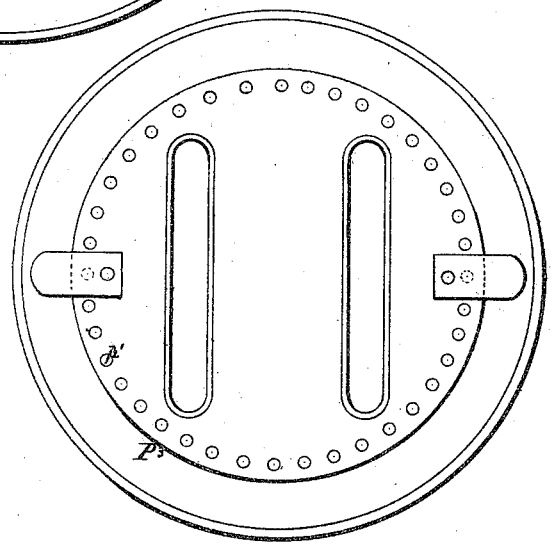
Figure 7:
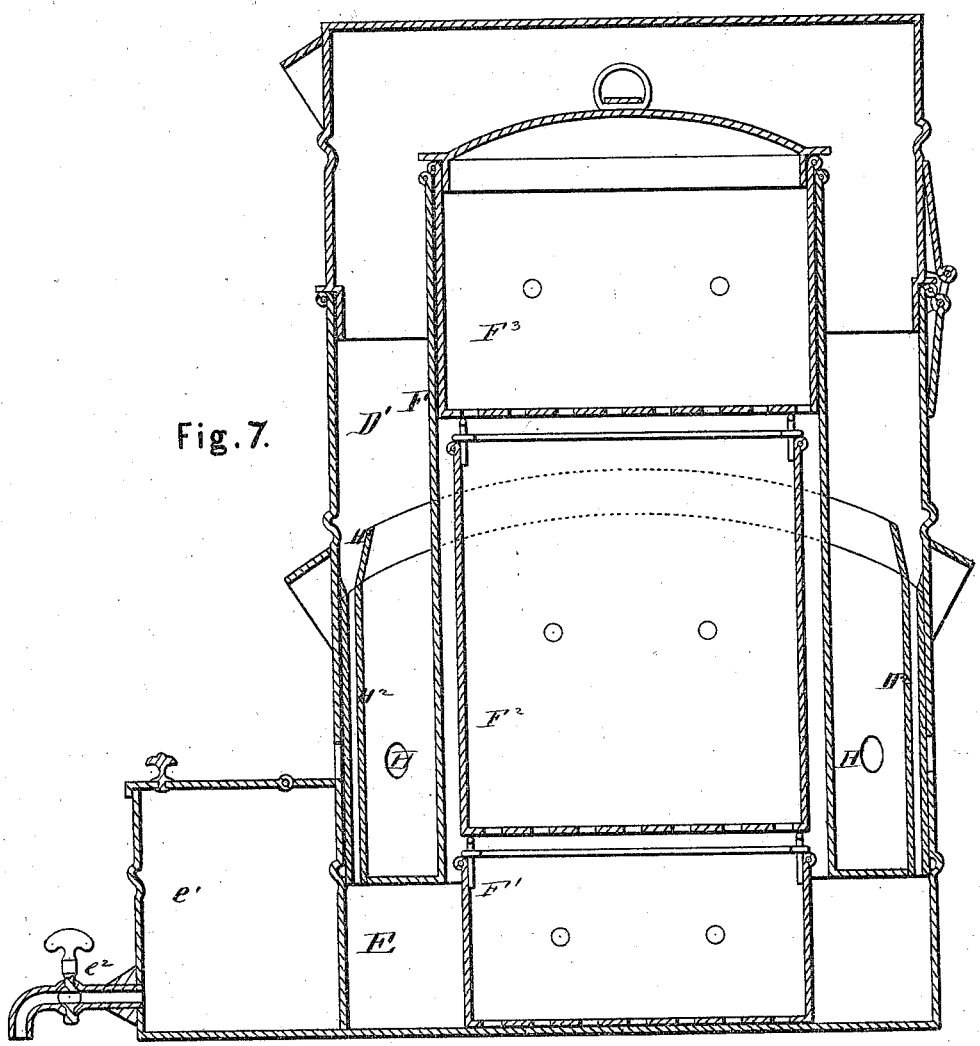
Figure 8:
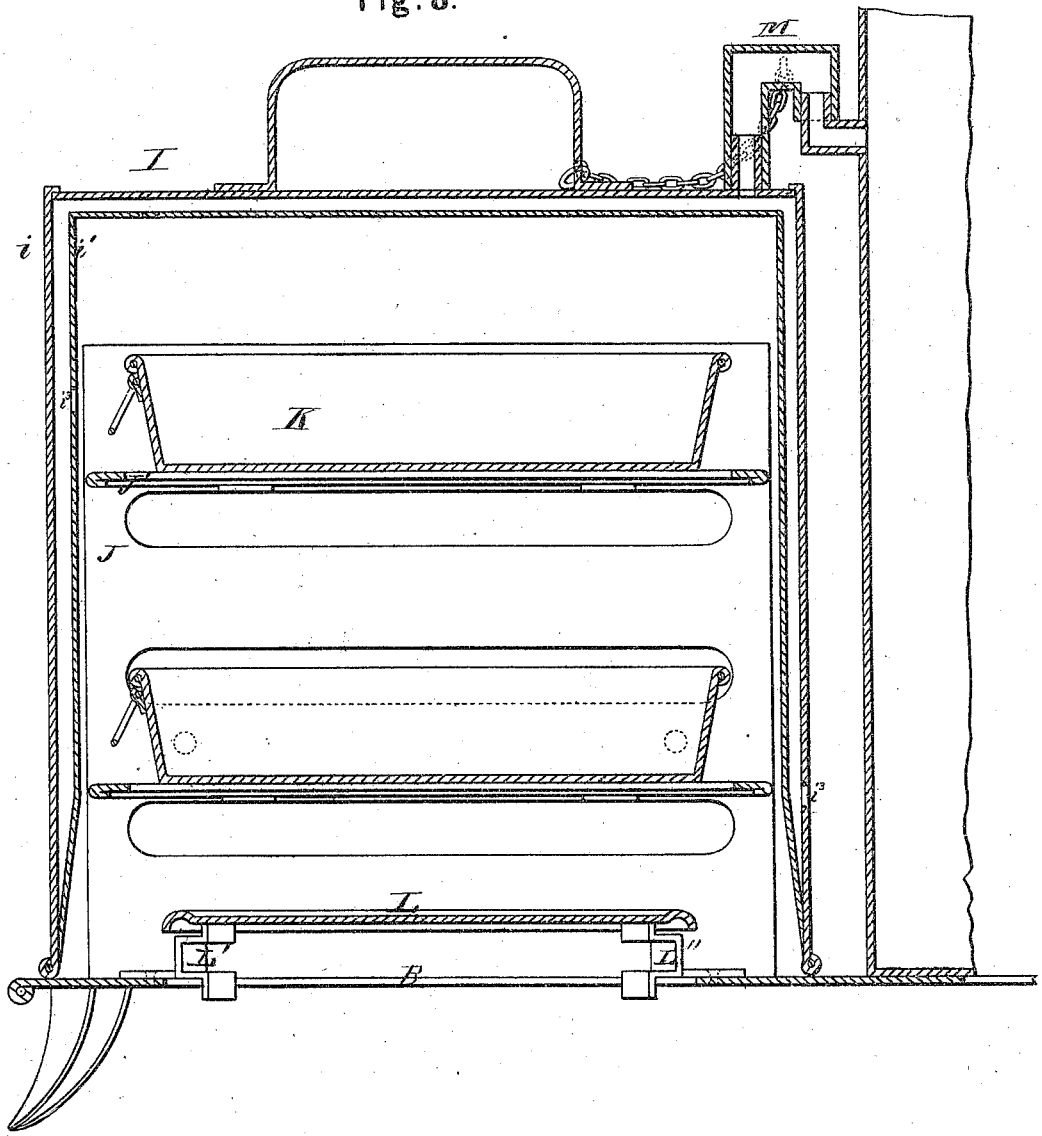
Figure 9:
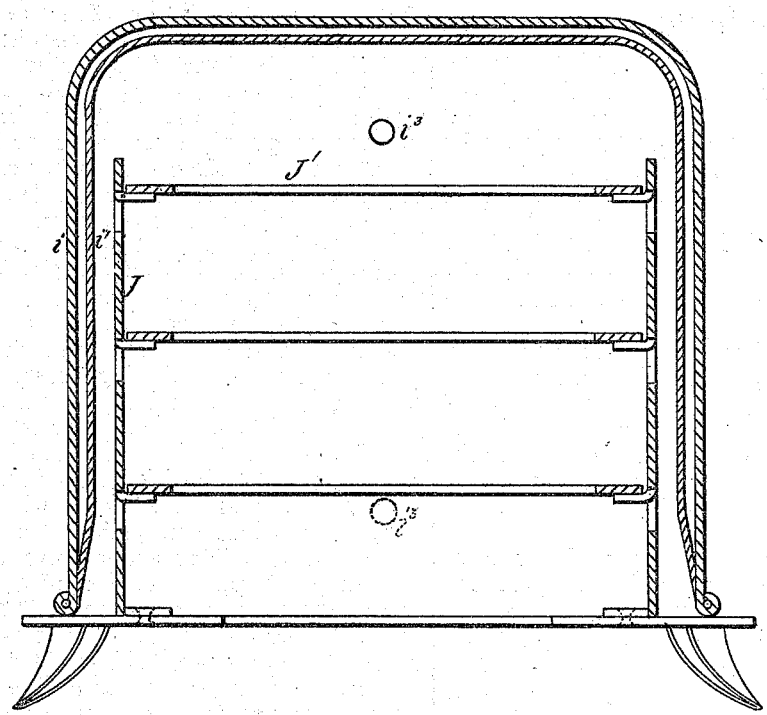

Figure 1 of the drawing is a representation of a side view of my invention complete. Fig. 2 is a vertical central section of improved lamp. Fig. 3 is a horizontal section of lamp through wick-tubes. Fig. 4 is a plan view of lamp with chimney-case removed. Fig. 5 is an under-side view of chimney-case. Fig. 6 is a top view of chimney-case. Fig. 7 is a vertical central section of steam cooking apparatus. Fig. 8 is a vertical central section of baking-oven. Fig. 9 is a transverse section of the oven.

This invention has relation to a portable cooking apparatus; and consists in the combination of a steamer, water-boiler, and baking-oven, and in the construction and novel arrangement of the various parts thereof, together with the improved kerosene-lamp used in heating, as and for the purpose hereinafter described.

Referring to the accompanying drawing, A represents the base of a cooking apparatus constructed with openings B for the heat of kerosene-lamps to reach the steamer and oven. C represents suitable kerosene-lamps, arranged underneath a table upon which the cooking apparatus is placed, or in any other convenient manner. D denotes a cylinder having a hinged lid, $d$, and constructed with a water-tank, E, at the bottom. F is an inner cylinder opening into said tank and designed to contain the perforated vessels $F^1$ $F^2$ $F^3$, in which different kinds of food are cooked by the steam arising from the water in the tank E. $e$ is a faucet used in emptying the tank E. $e^1$ represents a water-boiler attached to the cylinder D, and used for the purpose of boiling water to make tea or coffee. $e^2$ is a faucet to said boiler. As the food is cooking in the vessels $F^1$ $F^2$ $F^3$ the steam passes off through the top of the cylinder F, the cover being removed during the boiling. H represents a row of perforations around the cylinder D, through which cold air is admitted to the space $D'$ in such a way as to condense the steam therein. The condensed steam falls and is conducted by curved or inclined gutters $H^1$ to tubes $H^2$, through which it passes into the tank. In this way waste of water is avoided, and the odor of cooking food prevented from escaping into the room. I represents the baking-oven, having double walls $i$ $i^1$ to confine the heat, and perforations $i^3$ to create a draught. Within the oven are shelves $J'$, supported by walls J, and used to hold baking-pans K. L is a plate supported by standards $L'$, and intended to serve as a guard to the direct action of the flame, and to diffuse the heat thereof. The moisture arising from the contents of the oven is conducted by an elbow-tube, M, into the cylinder D, and follows the condensed steam. By this means the flavor of meats in the oven impregnates vegetables, &c., cooking in the steamer. The oven-casing is movable. N represents the oil-reservoir with which each of the lamps is provided. $N^1$ designates double wick-tubes, of which each lamp is furnished with two pairs. Those of each pair of said tubes stand close together. Each tube has a separate wick, and each wick is raised and lowered by a separate set of serrated wheels, $n$, arranged on a long shaft, $m^2$, and operating in the usual way. The shafts have their bearings in projecting plates $n^1$ $n^2$, of which $n^2$ has an open bearing, allowing the shaft to be lifted out. The shafts project over the sides of the receptacle N, and are held in place by means of vertical rods $N^2$ passing through loops $n^3$. By removing said rods the shafts may be readily taken out. The object in having the wicks arranged as stated is to allow of either one or more being used, as desired. O represents a shallow dish, supported above the top of the oil-receptacle by posts $O^1$, leaving an air-space between. This dish is designed to contain water to prevent the heat from the flames from being carried to the receptacles M. P indicates a perforated dish, supported above the dish O by means of posts $O^2$. The wick-tubes pass through openings in said dish. $O^3$ designates the wick-cones—one to each pair of wicks. The cones are furnished with lugs $O^4$ to fit apertures $O^5$. $P^1$ represents the chimneys, oval in form and tapering, as shown. The chimneys are placed side by side, secured together, and encircled by a conical sheet-metal wall, $P^2$. $P^3$ represents a conical casing, encircling the wall $P^2$, but leaving an air-space, $p$, through which the air circulates, passing out through perforations $p'$ in the top of said casing. This space and casing prevent the heat from the flames from being radiated to any considerable extent, and thus allows the cooking to be done with less flame, and thereby at a saving of oil. $P^4$ are apertures in the chimney-wall and casing, through which the flames may be observed. The outer aperture is covered by an isinglass panel, $P^3$. $P^5$ are projecting arms providing supports to the cooking apparatus.

What I claim as my invention, and desire to secure by Letters Patent, is—

1. In lamp-stoves, the shafts $m^2$, holding the serrated wick-elevating wheels $n$, having their bearings in the plate $n^2$, and held in place by means of the vertical rods N, fitted in loops $n^3$, and employed as and for the purpose specified.

2. In lamp-stoves, the chimneys $P^1$, conical wall $P^2$, and perforated casing $P^3$, combined and arranged substantially as specified.

In testimony that I claim the above I have hereunto subscribed my name in the presence of two witnesses.

JOHN GRAHAM COOEY.

Witnesses:
X. HERBERT VAIL,
HENRY TURNER.